US009417794B2

(12) United States Patent
Tan et al.

(10) Patent No.: US 9,417,794 B2
(45) Date of Patent: Aug. 16, 2016

(54) INCLUDING PERFORMANCE-RELATED HINTS IN REQUESTS TO COMPOSITE MEMORY

(75) Inventors: Cheng P. Tan, Fremont, CA (US); Khalu C. Bazzani, San Francisco, CA (US); Sergio J. Henriques, Valencia, CA (US); Christopher J. Sarcone, San Jose, CA (US); Joseph Sokol, Jr., San Jose, CA (US); Dominic B. Giampaolo, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 980 days.

(21) Appl. No.: 13/191,348

(22) Filed: Jul. 26, 2011

(65) Prior Publication Data

US 2013/0031298 A1   Jan. 31, 2013

(51) Int. Cl.
| | |
|---|---|
| G06F 12/02 | (2006.01) |
| G06F 3/06 | (2006.01) |
| G06F 12/06 | (2006.01) |
| G06F 13/16 | (2006.01) |
| G06F 15/167 | (2006.01) |

(52) U.S. Cl.
CPC ............ *G06F 3/0604* (2013.01); *G06F 3/0656* (2013.01); *G06F 3/0659* (2013.01); *G06F 3/0685* (2013.01); *G06F 12/0246* (2013.01); *G06F 12/0638* (2013.01); *G06F 13/16* (2013.01); *G06F 15/167* (2013.01); *Y02B 60/1225* (2013.01)

(58) Field of Classification Search
CPC ............................... G06F 13/16; G06F 15/167
See application file for complete search history.

(56) References Cited

U.S. PATENT DOCUMENTS

| | | | |
|---|---|---|---|
| 5,333,138 | A | 7/1994 | Richards et al. |
| 5,664,096 | A | 9/1997 | Ichinomiya et al. |
| 5,966,734 | A | 10/1999 | Mohamed et al. |
| 6,105,103 | A | 8/2000 | Courtright et al. |
| 7,117,399 | B2 | 10/2006 | Song |

(Continued)

OTHER PUBLICATIONS

Timothy Bisson, Scott A. Brandt, Darrell D.E. Long, "A Hybrid Disk-Aware Spin-Down Algorithm with I/O Subsystem Support," Performance, Computing, and Communications Conference, 2007. IPCCC 2007. IEEE International, pp. 236, 245, Apr. 11-13, 2007.

(Continued)

*Primary Examiner* — Charles Rones
*Assistant Examiner* — Tian-Pong Chang
(74) *Attorney, Agent, or Firm* — Blakely, Sokoloff, Taylor & Zafman LLP (57) ABSTRACT

A composite memory device that includes different types of non-volatile memory devices, which have different performance characteristics, is described. This composite memory device may receive requests, a given one of which includes a command, a logical address for at least a block of data associated with the command, and a hint associated with the command. For the given request, the composite memory device executes the command on the block of data at the logical address in at least one of the types of non-volatile memory devices. Furthermore, the composite memory device conditionally executes the hint based on one or more criteria, such as: available memory in the types of non-volatile memory devices, traffic through an interface circuit in the composite memory device, operational states of the types of non-volatile memory devices, a target performance characteristic of the composite memory device, and an environmental condition of the composite memory device.

26 Claims, 7 Drawing Sheets

(56) References Cited

U.S. PATENT DOCUMENTS

| | | | |
|---|---|---|---|
| 7,318,118 | B2 | 1/2008 | Chu et al. |
| 7,411,757 | B2 | 8/2008 | Chu et al. |
| 7,644,239 | B2 | 1/2010 | Ergan et al. |
| 7,861,032 | B2 | 12/2010 | Song et al. |
| 7,975,095 | B2 | 7/2011 | Hsieh et al. |
| 8,151,064 | B2 | 4/2012 | Lee |
| 8,370,558 | B2 | 2/2013 | Natarajan et al. |
| 2003/0051104 | A1* | 3/2003 | Riedel ................ G06F 1/3225 711/154 |
| 2005/0154852 | A1* | 7/2005 | Nakagawa et al. ........... 711/170 |
| 2007/0168602 | A1 | 7/2007 | Takai et al. |
| 2007/0168604 | A1 | 7/2007 | Takai et al. |
| 2007/0168606 | A1 | 7/2007 | Takai et al. |
| 2007/0271428 | A1* | 11/2007 | Atluri ........................ 711/162 |
| 2008/0025706 | A1 | 1/2008 | Yoshida et al. |
| 2008/0046660 | A1 | 2/2008 | Takai et al. |
| 2008/0077729 | A1* | 3/2008 | Kim et al. .................... 711/103 |
| 2008/0126680 | A1* | 5/2008 | Lee et al. .................... 711/103 |
| 2008/0126686 | A1* | 5/2008 | Sokolov et al. ............. 711/103 |
| 2008/0215800 | A1* | 9/2008 | Lee et al. .................... 711/103 |
| 2008/0244164 | A1* | 10/2008 | Chang et al. ................ 711/103 |
| 2009/0082068 | A1 | 3/2009 | Sakai |
| 2009/0135700 | A1* | 5/2009 | Fujibayashi ........ G11B 15/689 369/85 |
| 2009/0138220 | A1* | 5/2009 | Bell et al. ....................... 702/60 |
| 2009/0313416 | A1 | 12/2009 | Nation |
| 2010/0037017 | A1 | 2/2010 | Ryu et al. |
| 2011/0047192 | A1* | 2/2011 | Utsunomiya ................ 707/809 |
| 2011/0072430 | A1 | 3/2011 | Mani |
| 2012/0151159 | A1* | 6/2012 | Muralimanohar et al. ... 711/154 |

OTHER PUBLICATIONS

Wang, An-I, Andy, et al., "The Conquest file system: Better performance through a disk/persistent-RAM hybrid design." ACM Transactions on Storage, vol. 2, No. 3, Aug. 2006, 309-348.

Bisson, Timothy and Scott A. Brandt. "Reducing hybrid disk write latency with flash-backed i/o requests." Modeling, Analysis, and Simulation of Computer and Telecommunication Systems, 2007. MASCOTS'07. 15th International Symposium on. IEEE, 2007.

Bisson, T.; Brandt, S.A.; Long, D.D.E, "NVCache: Increasing the Effectiveness of Disk Spin-Down Algorithms with Caching," Modeling, Analysis, and Simulation of Computer and Telecommunication Systems, 2006. MASCOTS 2006. 14th IEEE International Symposium on, pp. 422, 432, Sep. 11-14, 2006.

Young-Jin Kim; Sung-Jin Lee; Kangwon Zhang; Jihong Kim; "I/O Performance Optimization Techniques for Hybrid Hard Disk-Based Mobile Consumer Devices," Consumer Electronics, IEEE Transactions on, vol. 53, No. 4, pp. 1469, 1476, Nov. 2007.

* cited by examiner

|   | Features(7:0) | Command | C | R | R | R | PM Port | FIS Type (27h) |
|---|---|---|---|---|---|---|---|---|
| 0 | Features(7:0) | Command | C | R | R | R | PM Port | FIS Type (27h) |
| 1 | Device | LBA(23:16) | LBA(15:8) | | | | | LBA(7:0) |
| 2 | Features(15:8) | LBA(47:40) | LBA(39:32) | | | | | LBA(31:24) |
| 3 | Control | ICC (7 6 5 4 3 2 1 0) | Count(15:8) | | | | | Count(7:0) |
| 4 | Hint | Hint | Reserved(0) | | | | | Reserved(0) |

RECEIVE REQUESTS IN AN INTERFACE CIRCUIT IN A COMPOSITE MEMORY DEVICE THAT INCLUDES DIFFERENT TYPES OF MEMORY HAVING DIFFERENT PERFORMANCE CHARACTERISTICS, WHERE A GIVEN REQUEST INCLUDES A COMMAND, A LOGICAL ADDRESS FOR AT LEAST A BLOCK OF DATA ASSOCIATED WITH THE COMMAND, AND A HINT ASSOCIATED WITH THE COMMAND
510

↓

FOR THE GIVEN REQUEST, EXECUTE THE COMMAND ON THE BLOCK OF DATA AT THE LOGICAL ADDRESS IN AT LEAST ONE OF THE TYPES OF MEMORY
512

↓

FOR THE GIVEN REQUEST, CONDITIONALLY EXECUTE THE HINT BASED ON ONE OR MORE CRITERIA
514

INCLUDING PERFORMANCE-RELATED HINTS IN REQUESTS TO COMPOSITE MEMORY

BACKGROUND

1. Field

The present disclosure relates to a system that includes different types of memory having different performance characteristics. More specifically, the present disclosure relates to a system that includes conditionally executed hints in requests conveyed to a composite memory, which includes the different types of memory.

2. Related Art

Computer systems typically include different types of memory and storage devices, such as: static random access memory (SRAM), dynamic random access memory (DRAM), flash memory, a hard-disk drive (HDD), an optical disk drive, a tape drive and/or a solid-state drive (SSD). Furthermore, software modules within an operating system, which are associated with the different types of memory, are often used to implement a data-storage management system that can handle data requests from the user or an application, as well as from the operating system.

The performance characteristics of the different types of memory can have a strong impact on the overall performance of the computer system. For example, the input/output (I/O) performance of a computer system can be adversely affected by the I/O performance of HDDs. While an HDD can provide a cost-effective storage solution, from a performance perspective it is often a weak link in a computer system, especially when small blocks of fragmented data are transferred between the HDD and the computer system. Moreover, HDDs are often affected by environmental conditions, such as temperature, vibration and/or shock, especially in portable systems. Additionally, an idling HDD can be a major source of power consumption.

In principle, the performance characteristics of other types of memory can be used to offset or mitigate the problems associated with HDDs. However, selecting the appropriate configuration of the types of memory or the disposition of one or more blocks of data among the types of memory can be challenging because there are typically tradeoffs in the performance characteristics of the different types of memory. For example, while SSDs have better I/O performance than HDDs, the cost of SSDs, which can be an order of magnitude larger per gigabyte than HDDs, can be prohibitive. In addition, flash memory (such as NAND flash memory) in SSDs typically has a limited number of programmable cycles.

Hence, what is needed is a technique for specifying the configuration of the types of memory or the disposition of one or more blocks of data in the types of memory that overcomes the problems listed above.

SUMMARY

The disclosed embodiments relate to a method for executing requests in a composite memory device that includes different types of non-volatile memory devices, which have different performance characteristics. For example, the composite memory device may include multiple hard-disk drives (HDDs) or an HDD and a solid-state memory (such as flash memory). The types of memory devices may share a common file system and/or data partitions in the types of memory devices may be arranged in a tiered performance hierarchy. Moreover, a given one of the requests includes a command, a logical address for at least a block of data associated with the command, and a hint associated with the command. In general, the given request may include a standard or a non-standard Serial Advanced Technology Attachment (SATA) command.

For the given request, the composite memory device executes the command on the block of data at the logical address in at least one of the types of non-volatile memory devices. Furthermore, the composite memory device conditionally executes the hint based on one or more criteria, such as: available memory in the types of non-volatile memory devices, traffic through an interface circuit in the composite memory device, operational states of the types of non-volatile memory devices, a target performance characteristic of the composite memory device, and an environmental condition of the composite memory device.

For example, the hint may specify a desired future location of the block of data in the types of memory devices or that the block of data is to be written using minimum power consumption. Alternatively or additionally, the hint may specify that the command has low priority relative to other commands so that the command is executed when resources are available in the composite memory device or that the block of data is to be purged from a location in one of the types of memory devices. In other examples, the hint may specify conditions under which the block of data is to be purged from a location in one of the types of memory devices or may specify a data partition in at least a portion of one of the types of memory devices.

By selectively executing the hint, the composite memory device may facilitate: improved input/output (I/O) throughput, enhanced reliability, reduced power consumption, increased availability of the composite memory device and/or the target performance characteristic.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
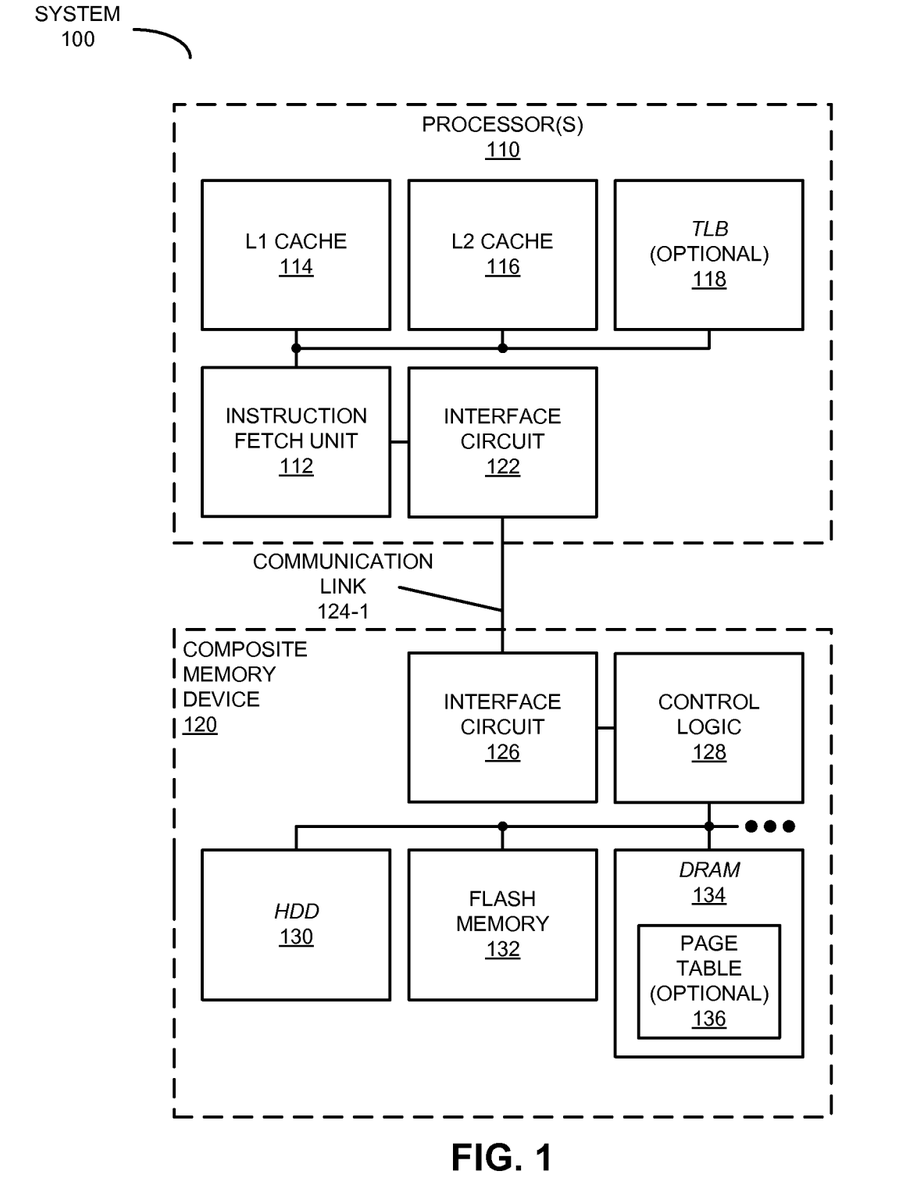
FIG. 1 is a block diagram of a system that includes different types of memory having different performance characteristics in accordance with an embodiment of the present disclosure.

FIG. 1 presents a block diagram of a system 100 (such as computer system 600 in FIG. 6) that includes different types of memory devices having different performance characteristics, such as different: data rates, cost, power consumption, access times, reliability, etc. In this system, an instruction fetch unit 112 (and, more generally, control logic) in one or more processors 110 fetches (for example, from L1 cache 114 and/or L2 cache 116) and executes instructions for generating a conditionally executed instruction (henceforth referred to as a 'hint') that specifies internal processing by a composite memory device 120 of an associated command. As described further below, these generated instructions may be associated with a common file system (or, more generally, the operating system) that manages: the disposition of the block of data (e.g., where the block of data is stored) in the different types of memory devices, for example, based on their different performance characteristics; data partitions in the types of memory devices (which may be arranged in a tiered performance hierarchy); and/or the operational states of the types of memory devices.

For example, system 100 may generate the hint based on: a power state of the system 100, an environmental condition (such as an ambient temperature), a desired availability of the block of data, a desired performance characteristic of an application executed by system 100, a data type of the block of data, etc. As a consequence, the hint may specify a desired future location of the block of data in the types of memory devices, or that the block of data is to be written using minimum power consumption. Alternatively or additionally, the hint may specify that the associated command has low priority relative to other commands so that the command is executed when resources are available in composite memory device 120, or that the block of data is to be purged from a location in one of the types of memory devices. In other examples, the hint may specify conditions under which the block of data is to be purged from a location in one of the types of memory devices, or may specify a data partition in at least a portion of one of the types of memory devices.

Subsequently, the hint is communicated from the host (which includes the one or more processors 110) to a composite memory device 120 in a request (which also includes the associated command and a logical address for at least a block of data associated with the command) using interface circuit 122, communication link 124-1 and interface circuit 126. Control logic 128 (and/or firmware) in composite memory device 120 executes the command on the block of data at the logical address in at least one of the types of memory devices. For example, in response to a read or write command, a first type of memory in the different types of memory (such as hard-disk drive or HDD 130) in composite memory device 120 accesses the block of data at the logical address.

Moreover, control logic 128 conditionally executes the hint based on at least one of: available memory in the types of memory devices, traffic through interface circuit 126, operational states of the types of memory devices, a target performance characteristic of composite memory device 120, and an environmental condition of composite memory device 120. This conditional execution may, at least in part, be motivated by incomplete information or 'situation awareness' between the host and composite memory device 120.

By selectively executing the hint, composite memory device 120 may facilitate: improved input/output (I/O) throughput, enhanced reliability (such as data integrity or resiliency), reduced power consumption, improved application performance in system 100, increased availability of composite memory device 120 (such as a reduced access time) and/or the target performance characteristic (such as improved system time to ready from cold boot or 'instant on,' sleep, resumption, etc.).

Note that communication link 124-1 may include: a serial ATA (SATA) interface, a Small Computer System Interface (SCSI) or a Serial Attached SCSI (SAS). Thus, as discussed below, the command may include a standard or a non-standard SATA command.

Furthermore, composite memory device 120 can include various types of memory, including a high-capacity, long-access-time storage device or mass-storage component, as well as lower-capacity, smaller-access-time storage devices or mass-storage components (such as a solid-state memory). In the discussion that follows, HDD 130 is used as an illustration of the high-capacity, long-access-time storage device, and flash memory 132 (such as NAND flash memory) and dynamic random access memory (DRAM) 134 are used as illustrations of the lower-capacity, smaller-access-time storage devices. However, in other embodiments a variety of non-volatile and/or volatile storage devices can be used in composite memory device 120 and, more generally, in a memory system in system 100. For example, the types of memory may include: a removable media drive, magnetic tape, a semiconductor memory (for example, RAM, ROM, EPROM, EEPROM, etc.), a hybrid storage device, a solid-state memory, an optical storage device (for example, a holographic storage device, a CD-ROM, a digital versatile disc or digital video disc, an electro-optic storage device, etc.), and/or another memory that stores information at least temporarily.

Thus, composite memory device 120 may include multiple HDDs or an HDD and a solid-state memory (or one or more groups of storage cells in the solid-state memory). In some embodiments, composite memory device 120 includes a hybrid storage device that includes multiple cooperating mass-storage components within a standard form factor, such as an HDD and flash memory in a standard 2.5" enclosure (i.e., the hybrid storage device may include different types of memory). However, even in the more general case, in which the different types of memory are not included in a standard form factor (i.e., the different types of memory are not built into composite memory device 120), the hint may enable high-level attributes to be passed to composite memory device 120, and low-level device attributes to be aggregated and communicated back to the host. This may allow fine tuning and coordination of the different types of memory in composite device 120 for future availability needs or other requirements (such as power consumption, redundancy, access time, a performance characteristic, etc.) that are anticipated by system 100.

In an exemplary embodiment, the one or more processors 110 may generate the hint based on a power state of the system 100. Thus, the hint may specify that the block of data is to be written using minimum power consumption or may specify determination of the expected power consumption. (This hint may be generated based on: the relative power consumption of HDD 130 and flash memory 132 and/or information in a file system (such as a logical address in the address space) that indicates that the block of data is stored on HDD 130.) In turn, control logic 128 may conditionally execute the hint based on: the available memory in the types of memory devices, the operational states of the types of memory devices, a target performance characteristic of composite memory device 120, and/or an environmental condition of composite memory device 120. For example, if HDD 130 is spinning, the block of data may be stored on it. Otherwise, the block of data may be stored on flash memory 132.

Alternatively, the hint may specify that HDD 130 read (and, then, erase) the block of data and transition to a low-power operating mode (for example, HDD 130 may be turned off), and may specify that flash memory 132 subsequently write the block of data. This approach may result in at least 25% reduction in power consumption.

Moreover, the one or more processors 110 may generate the hint based on an environmental condition (such as an ambient temperature). Thus, the hint may facilitate a response to an operating environmental change for data safety, such as powering down HDD 130 and storing data on flash memory 132. Moreover, control logic 128 may conditionally execute the hint based on: the available memory in the types of memory devices, the operational states of the types of memory devices, a target performance characteristic of composite memory device 120 and/or an environmental condition of composite memory device 120.

Furthermore, the one or more processors 110 may generate the hint based on a desired availability of the block of data. For example, the hint may specify a desired future location of the block of data in the types of memory devices (such as that the block of data may be stored in flash memory 132), or it may specify a data partition in at least a portion of one of the types of memory devices. This hint may also communicate an availability mode of at least one type of memory in composite memory device 120, such as: a time to ready, command response time, data redundancy. In response to receiving the hint, control logic 128 may conditionally execute it based on: the available memory in the types of memory devices, the operational states of the types of memory devices, a target performance characteristic of composite memory device 120 and/or an environmental condition of composite memory device 120.

In another example, the one or more processors 110 may generate the hint based on a desired performance characteristic of an application executed by system 100. For example, the hint may specify that the associated command has low priority relative to other commands so that the command is executed when resources are available in composite memory device 120 (this may include a low performance write that can occur whenever composite memory device 120 wants to perform it). Alternatively or additionally, the hint may specify that the block of data is to be purged from a location in one of the types of memory devices (such as purging an entry from cache) or conditions under which the block of data is to be purged from a location in one of the types of memory devices (such as how or when to flush data from a partition that is full). In turn, control logic 128 may conditionally execute the hint based on: the available memory in the types of memory devices, the traffic through interface circuit 126, the operational states of the types of memory devices, a target performance characteristic of composite memory device 120 and/or an environmental condition of composite memory device 120.

Thus, based on the hint, the block of data may be conditionally moved to a second type of memory in the different types of memory (such as flash memory 132) to facilitate subsequent accesses to the block of data. In this example, the hint may be generated based on: the relative data rates of HDD 130 and flash memory 132, information in a file system (such as a logical address in the address space) that indicates that the block of data is stored on HDD 130, and/or information that indicates that the block of data will be used routinely in the near future (such as when the block of data includes fonts that will be used with an application that is being executed by one or more processors 110). (More generally, the hint may be based on characteristics of one or more applications that are being executed by system 100, such as previously monitored performance of an application or blocks of data that are associated with core services provided by an operating system for the application.) Consequently, in this case the hint may specify that HDD 130 to read (and, then, erase) the block of data, and may specify that flash memory 132 to subsequently write the block of data (for example, to a group of sixteen flash memory cells). (In addition, the address space associated with the file system in system 100 may be remapped so that the logical address for the block of data is on the second type of memory.) In this way, the hint may help ensure short access time during the current and/or subsequent access commands, i.e., high performance. (In the preceding discussion, note that a suggested move operation was used as an illustrative example of the hint. However, in other embodiments, the hint may suggest a copy operation, in which data is stored on two different types of memory in composite memory device 120. In these embodiments, there may be a pointer in the address space to two or more memory devices for the same logical address.)

In a variation on this example, system 100 may be aware of the I/O payload content when a data transfer request is made between system 100 and a target type of memory. Consequently, an I/O payload can be further described and categorized based on: usage characteristics (such as the data reuse probability and frequency), data payload size or type, useful life/time of the data, and/or any other relevant characteristics. In conjunction with the performance characteristics of the different types of memory, these I/O payload classifications can be used to generate the hint, which allows system 100 to specify the best location (i.e., which type of memory) in which to store or retrieve the data regardless of the topology or architecture of composite memory device 120 (and, more generally, a memory system). Therefore, the hint may specify direct data-transfer requests to a specific type of memory, or even a specific memory device or group of storage cells. Note that such a data migration may occur among the types of memory in composite memory device 120 in response to the hint.

More generally, the hint may allow background data transfers or synchronization between different types of memory in composite memory device 120. For example, data may be moved within different partitions, either within a tier of memory or across different tiers of memory (thus, a hint may specify one or more partitions). This capability may help ensure data coherence or may change the availability of the data. Furthermore, the hint may allow the use of multiple segments of non-volatile flash memory. This may facilitate concurrent data availability and/or different power modes. It may also facilitate sharing of tiers of memory between the host and composite memory device 120.

Consequently, by migrating data to flash memory 132, the hint may facilitate capabilities such as: a quick boot (e.g., in less than 5 s) even though HDD 130 may historically require tens of seconds to boot. Similarly, by strategic pinning of high-value application data, the hint may facilitate consistently faster launches of an application.

In other exemplary embodiments, the hint can be used to select or obtain one or more specific characteristics, such as: minimizing usage of HDD 130, minimizing the spinning time of HDD 130 (to reduce power consumption or to improve reliability by decreasing the windows for shock damage and wear out), maximizing a data rate or the I/O transfer rate, increasing data redundancy (and, thus, increasing data availability), minimizing overall power consumption, improving operating-system efficiency and/or improving file-system I/O efficiency.

Thus, the hint may facilitate data retention and data flows in composite memory device 120 (and, more generally, data management policies in a memory system) that allow the performance or the characteristics of composite memory device 120 to be specified or adjusted (for example, high performance or low power consumption) based on the different performance characteristics of the different types of memory. In other words, this performance-characteristic-aware storage-management technique (which leverages knowledge or awareness of the performance characteristics of the different types of memory in the file system and the hardware/software drivers of the operating system) may allow the characteristics of composite memory device 120 and/or system 100 (such as access time, power consumption and/or data availability) to be dynamically modified by providing hints to composite memory device 120, which are conditionally executed to obtain a desired synthesized characteristic.

Separately from the hints that may be included in requests, in some embodiments new commands are used in system 100. For example, a command may instruct composite memory device 120 to specify the current partition (and, more generally, to provide feedback to the host). If the partitioning is improper for a particular application or a desired performance characteristic, another command may format an area (i.e., it may create a data partition) in a non-volatile memory (such as at least a portion of one of the types of memory devices) for a particular use. Thus, using this command, a portion of flash memory 132 may be dynamically partitioned for use: by an internal device, as a read cache, and/or during a write command. This device-managed partition may facilitate: fast device time to ready, writer buffering, power reduction, improved mechanical reliability, storage of expired blocks of data, overprovisioning, etc. Note that a special command may also be used to independently or concurrently change power states of flash memory 132 and HDD 130.

Another new command may be a so-called 'smart' command or 'health-check' command, which may request that composite memory device 120 report information, such as: a usage level, reliability of one or more of the types of memory, etc.

In order to facilitate generation of the hint by the one or more processors 110, the file system in system 100 may maintain some information about composite memory device 120. In particular, in response to the command or the hint, composite memory device 120 may provide current data partitions in the types of memory devices, storage-utilization information for the different types of memory and/or operational states of the types of memory to system 100, such as information that indicates utilization (or available memory) of the types of memory and/or any internal partitions in composite memory device 120. However, in some embodiments composite memory device 120 provides detailed disposition information to the file system. For example, composite memory device 120 may provide information that specifies the location of the block of data. This detailed disposition information may allow the file system to select a desired characteristic or a targeted data configuration in the types of memory based on one or more constraints, and to generate a hint accordingly.

Consequently, there may be a range of functionality in system 100 (and in the subsequent embodiments) ranging from: a hint that is generated without a priori knowledge of the disposition of the data in composite memory device 120, to a hint that is generated with knowledge of the utilization of the types of memory, to a hint that is generated with detailed knowledge of the disposition of the data in composite memory device 120.

In some embodiments, the detailed knowledge of the disposition of the data in composite memory device 120 (i.e., where the data is located) may be included in optional page table 136 (which may be stored in DRAM 134 or flash memory 132) for different threads and/or optional translation lookaside buffer (TLB) 118 (which may be in the one or more processors 110 or between the one or more processors 110 and DRAM 134, and which may act as a cache for larger optional page table 136). Note that either TLB 118 or optional page table 136 may convert virtual addresses in the address space associated with the file system into physical addresses.

Thus, one of the examples in the preceding discussion illustrated the hint as including a suggestion to conditionally move or copy the block of data. This may give the types of memory in composite memory device 120 the option to perform the move or copy operation later (such as within a specified time interval) or not to perform the move or copy operation at all (such as when the second type of memory is full or unavailable). This flexibility may be useful in embodiments where the file system does not have utilization information or detailed a priori information about the data disposition before generating the hint or, as described below, where one or more processors 110 do not perform the function of a memory controller for composite memory device 120.

In this way, the hint can be used to modify or select the overall performance (and, more generally, a characteristic) of composite memory device 120 and/or system 100. For example, the second type of memory may have lower power consumption than the first type of memory and, in the event of a low battery power in system 100, the hint may help ensure that subsequent accesses to the block of data have reduced power consumption. Alternatively or additionally, the second type of memory may have a higher data rate than the first type of memory and, based on characteristics of an application executed by system 100, the hint may help ensure that subsequent accesses to the block of data are fast.

Figure 2:
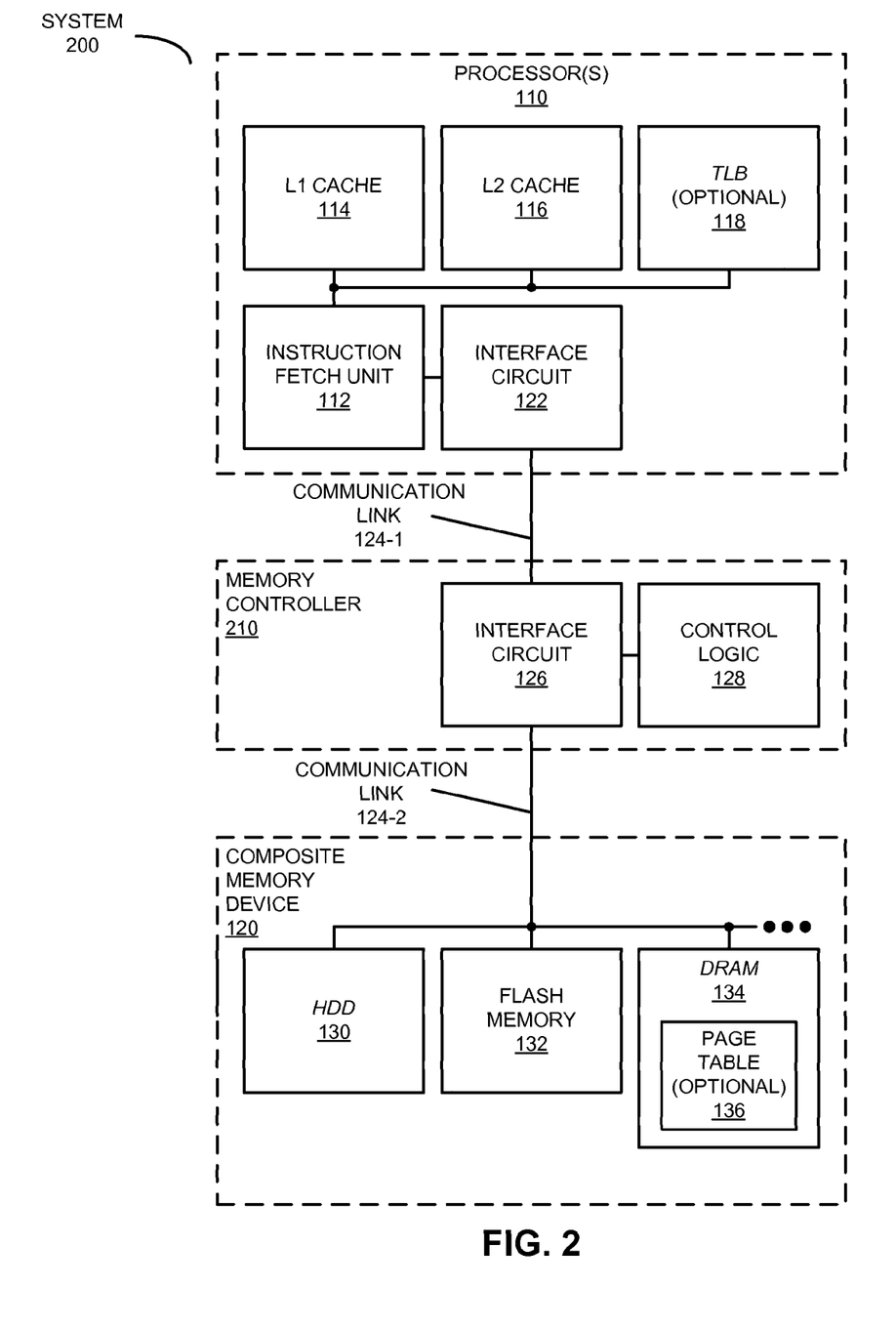
FIG. 2 is a block diagram of a system that includes different types of memory having different performance characteristics in accordance with an embodiment of the present disclosure.

In system 100, the memory controller for composite memory device 120 is implemented by one or more processors 110 and/or in the operating system, such as in systems where the types of memory are on a motherboard. Consequently, the detailed disposition of data in composite memory device 120 may be transparent to the operating system, i.e., composite memory device 120 may not be a 'black box' to the rest of system 100. However, in other embodiments, the memory system includes a memory controller that is separate from the operating system, i.e., the details of the memory system may be a 'black box' to the rest of the system. This is illustrated in FIG. 2, which presents a block diagram of a system 200 that includes different types of memory having different performance characteristics.

In system 200, the hint generated by the one or more processors 110 may suggest that memory controller 210 perform data management, for example, to conditionally move or copy the block of data from the first type of memory to the second type of memory. In particular, interface circuit 126 in memory controller 210 may receive the hint and the associated command. In response to this command, control logic 128 in memory controller 210 may forward the command to the first type of memory (such as HDD 130) using communication link 124-2. In addition, in response to the hint, control logic 128 may move the block of data to the second type of memory (such as flash memory 132) using communication link 124-2 to facilitate the subsequent accesses to the block of data by providing a read command for the block of data to the first type of memory and a write command for the block of data to the second type of memory.

While the preceding embodiments illustrate a hint that is associated with a specific command, in other embodiments a hint may be generated to select or modify one or more characteristics of composite memory device 120, system 100 (FIG. 1) and/or system 200 for multiple subsequent commands that are directed to blocks of data at logical addresses, i.e., the hint may modify the data storage and management in composite memory device 120 for a time interval that encompasses multiple commands directed to blocks of data at logical addresses. Thus, the hint may be considered 'permanent' by composite memory device 120 until a subsequent and superseding hint is received. Alternatively, the hint may be aged out based on a receipt timestamp by composite memory device 120 using firmware.

For example, the hint may be generated based on the different performance characteristics of the different types of memory and a global parameter of at least one of: composite memory device 120, a memory system that includes composite memory device 120, system 100 (FIG. 1) and/or system 200. In response to the hint, a given type of memory may move the blocks of data to another type of memory in the different types of memory if copies of the blocks of data are not already stored on the type of memory. Furthermore, in response to the subsequent commands, a given one of the types of memory may access the blocks of data at the logical addresses. In this way, the hint may help define or specify an operating mode, which has one or more associated characteristics (such as low power, high I/O performance or high data availability), for at least one of: composite memory device 120, the memory system that includes composite memory device 120, system 100 (FIG. 1) and/or system 200.

In an exemplary embodiment, the one or more characteristics can tailor the power and/or performance of at least one of composite memory device 120, the memory system that includes composite memory device 120, system 100 (FIG. 1) and/or system 200 for mobile versus desktop environments. Thus, the global parameter may include a power state of system 100 (FIG. 1) or 200, such as when the stored energy in a battery is running low. Alternatively or additionally, the global parameter may include the I/O performance of an application, and the hint may ensure that the blocks of data can be accessed on the type of memory with a high data rate and a low access time, and/or that the blocks of data have high availability (such as multiple copies in one of the types of memory).

Figure 3:
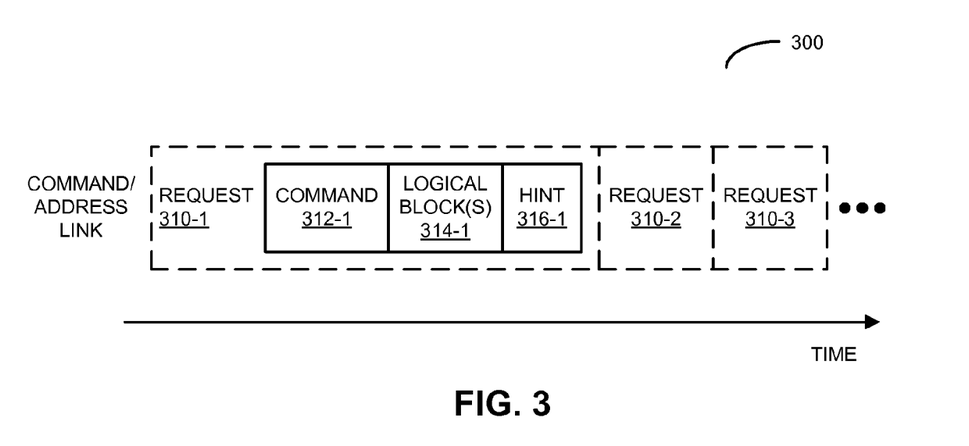
FIG. 3 is a block diagram that illustrates requests on a communication link in the system of FIG. 1 or the system of FIG. 2 in accordance with an embodiment of the present disclosure.

A variety of techniques and configurations may be used to convey or communicate one or more hints to composite memory device 120 in FIGS. 1 and 2. For example, as shown in FIG. 3, which presents a timing diagram 300 that illustrates requests on a communication link (such as a command/address link) in system 100 (FIG. 1) or system 200 (FIG. 2), hints (such as hint 316-1) may be included in at least some of the requests (such as request 310-1), along with commands (such as command 312-1) and information associated with at least one of the logical blocks (such as logical block 314-1).

Figure 4:
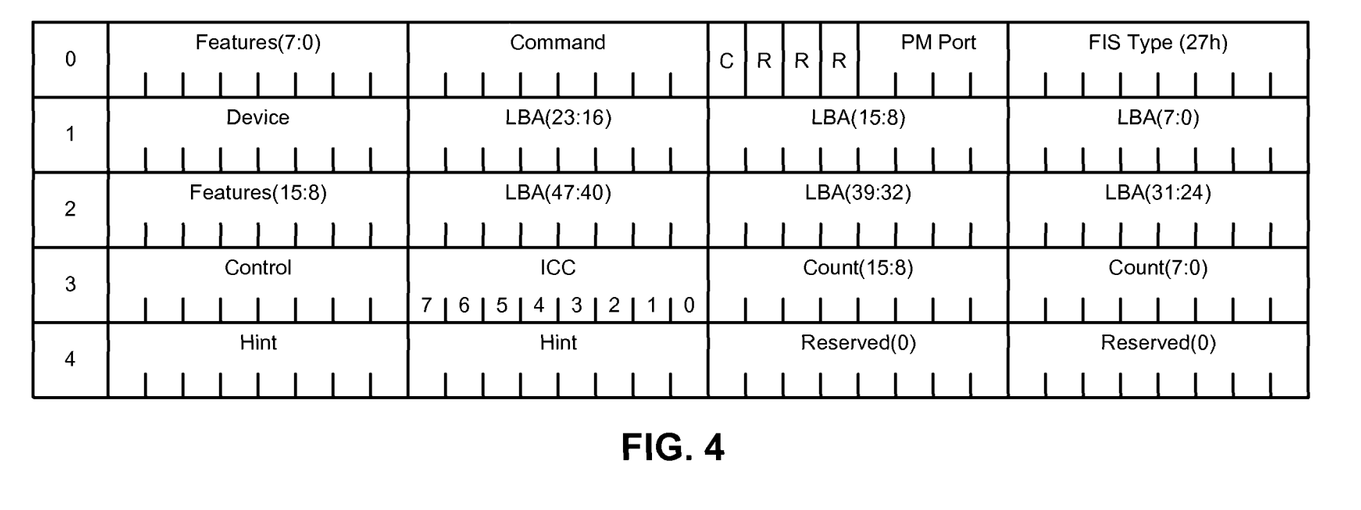
FIG. 4 is a block diagram that illustrates an example of a Serial Advanced Technology Attachment (SATA) command in a request in accordance with an embodiment of the present disclosure.

In some embodiments, the hint may be conveyed using a standard or a non-standard SATA command. For example, as illustrated in FIG. 4, some fields that are not currently being used may be repurposed. In particular, a SATA command can include five double words or 20 bytes. However, per the SATA standard, only 16 bytes are used. As a consequence, a hint may be included at the end of the 20-byte structure. Moreover, this approach may also allow communication of a non-standard, but valid vendor-specific command.

Figure 5:
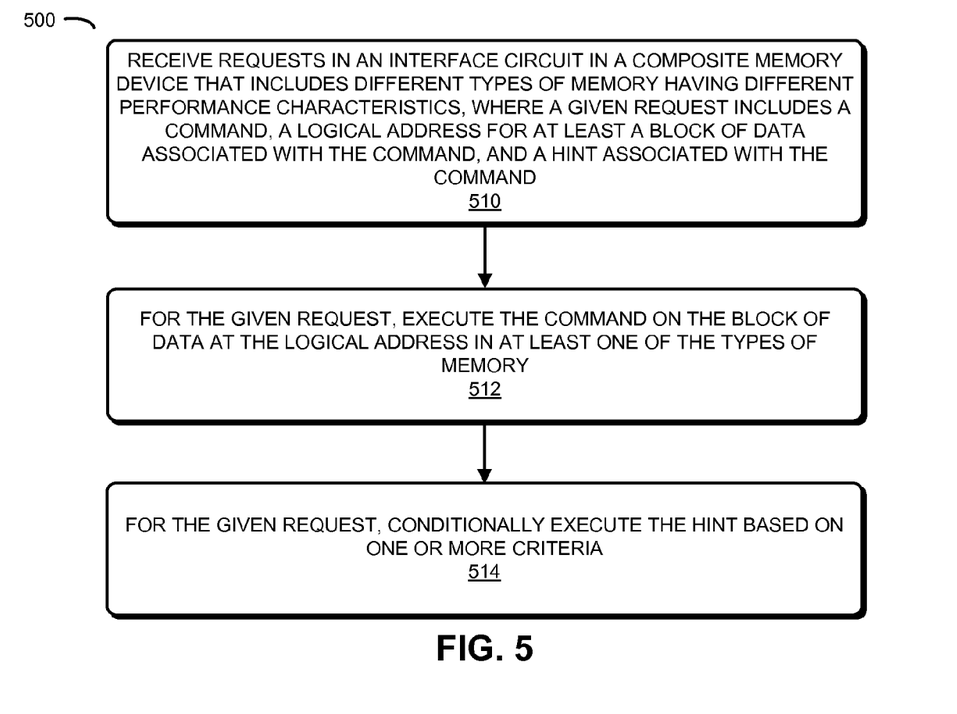
FIG. 5 is a flow diagram of a method for executing requests in the system of FIG. 1 or the system of FIG. 2 in accordance with an embodiment of the present disclosure.

We now describe embodiments of a storage-management technique. FIG. 5 presents a flow diagram of a method 500 for executing requests in system 100 (FIG. 1) or system 200 (FIG. 2). During this method, an interface circuit in a composite memory device that includes different types of memory devices, which have different performance characteristics, receives the requests, where a given request includes a command, a logical address for at least a block of data associated with the command, and a hint associated with the command (operation 510). Then, for the given request, the command on the block of data at the logical address in at least one of the types of non-volatile memory devices is executed (operation 512). Moreover, for the given request, the hint is conditionally executed based on one or more criteria (operation 514). For example, the one or more criteria may include: available memory in the types of memory devices, traffic through the interface circuit, operational states of the types of memory devices, a target performance characteristic of composite memory device 120 (FIGS. 1 and 2), and an environmental condition of composite memory device 120 (FIGS. 1 and 2).

In some embodiments of method 500 there may be additional or fewer operations. Moreover, the order of the operations may be changed and/or two or more operations may be combined into a single operation.

Figure 6:
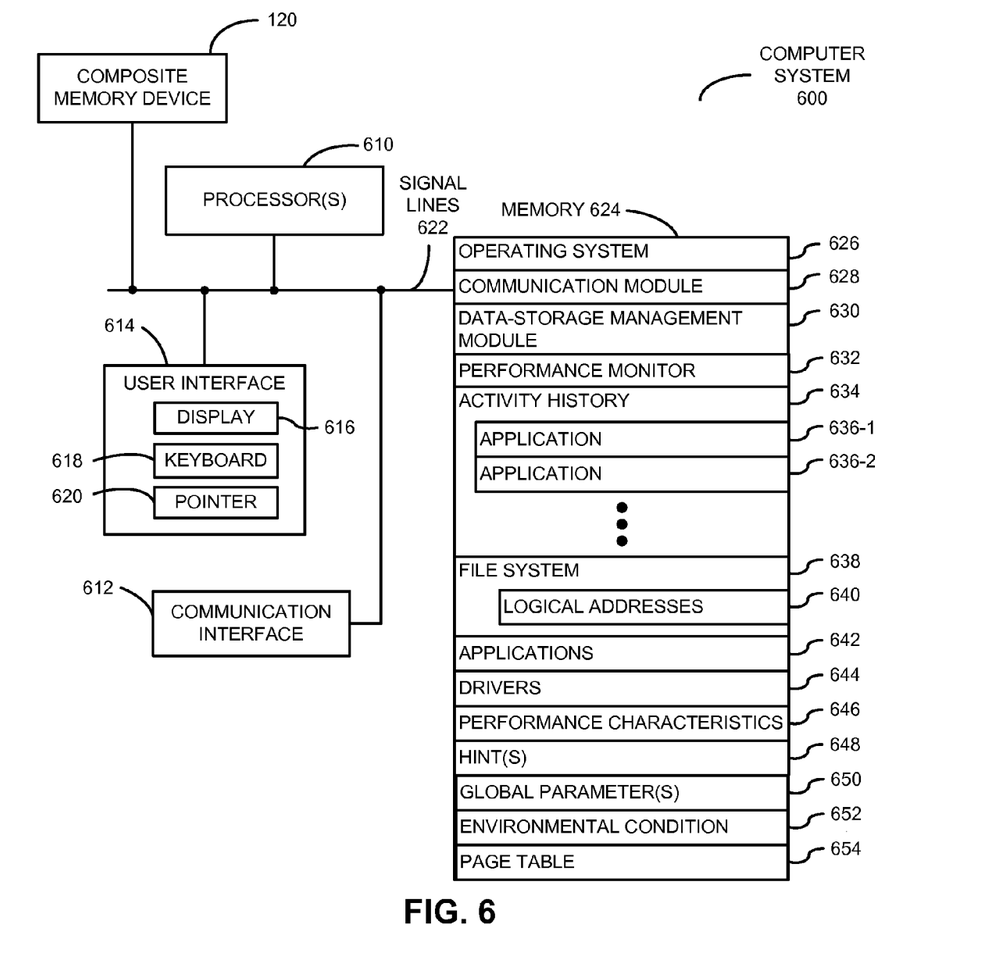
FIG. 6 is a block diagram of a computer system, which may include the system of FIG. 1 or the system of FIG. 2, in accordance with an embodiment of the present disclosure.

We now describe embodiments of the computer system. FIG. 6 presents a block diagram of a computer system 600, which may include system 100 (FIG. 1) or system 200 (FIG. 2). This computer system includes: one or more processors 610 (or processor cores or elements, and more generally a means for computing), communication interface 612, a user interface 614, and one or more signal lines 622 coupling these components together. Note that the one or more processors 610 may support parallel processing and/or multi-threaded operation, the communication interface 612 may have a persistent communication connection, and the one or more signal lines 622 may constitute a communication link or a communication bus. Moreover, the user interface 614 may include: a display 616, a keyboard 618, and/or a pointer 620, such as a mouse.

In this discussion, a 'computer' or 'computer system' includes one or more electronic devices that are capable of manipulating computer-readable data or communicating such data between two or more computer systems over a network, including: a personal computer, a laptop computer, a mainframe computer, a server, a work station, a portable computing device or a portable electronic device (such as a cellular phone or personal digital assistant that a user can readily carry or move from one location to the next), a personal organizer, a client computer (in a client-server architecture), a tablet computer, a digital signal processor, a game console, an MP3 player, a device controller, and/or a computational engine within an appliance. Furthermore, a 'keyboard' includes a user interface device (or, more generally, an input device) with physical or virtual keys (such as on a touch-sensitive display) that a user can activate by moving one or more digits to provide alphanumeric information. Additionally, a 'mouse' includes a user interface device (or, more generally, an input device) that a user can move or manipulate (for example, by moving their hand or by clicking on a button) to move a cursor (or, more generally, an icon on a display where characters can be entered, corrected or deleted) or to select an object (such as displayed text). Note that a 'display' may include a wide variety of devices that can present information or receive user instructions, including: a cathode ray tube, a liquid-crystal display, a light-emitting-diode display, a projection display, a touch-sensitive display (or touch screen), a flexible display (such as a polymer display), an organic light-emitting-diode display, an electronic-ink display, etc.

Memory 624 in the computer system 600 may include volatile memory and/or non-volatile memory that are configured to store information. More specifically, memory 624 may include: ROM, RAM, EPROM, EEPROM, flash memory, one or more smart cards, one or more magnetic disc storage devices, magnetic tape, one or more optical storage devices, and/or other media capable of storing code and/or data now known or later developed. Memory 624 may store an operating system 626 that includes procedures (or a set of instructions) for handling various basic system services for performing hardware-dependent tasks. While not explicitly indicated in computer system 600, in some embodiments operating system 626 includes a web browser, such as: Internet Explorer™ (from Microsoft Corporation, of Redmond, Wash.), Safari™ (from Apple Inc., of Cupertino, Calif.), and/or Firefox (from the Mozilla Foundation, of Mountain View, Calif.). Additionally, memory 624 may store procedures (or a set of instructions) in a communication module 628. These communication procedures may be used for communicating with composite memory device 120, as well as one or more computers and/or servers (including computers and/or servers that are remotely located with respect to computer system 600).

Memory 624 may also include multiple program modules (or sets of instructions), including: data-storage management module 630 (or a set of instructions), performance monitor 632 (or a set of instructions), applications 642 (or sets of instructions) and/or drivers 644 (or sets of instructions). Note that one or more of these program modules (or sets of instructions) may constitute a computer-program mechanism.

Figure 7:
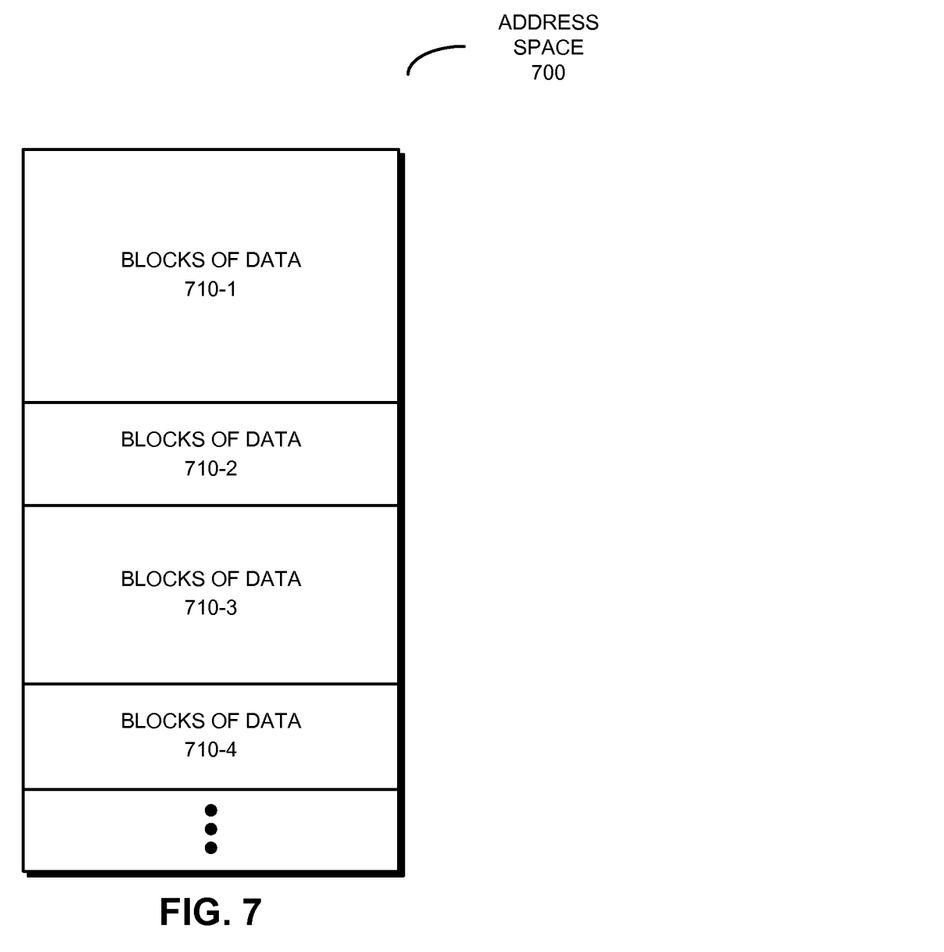
FIG. 7 is a block diagram of an address space, which is associated with a file system, for use in the computer system in FIG. 6 in accordance with an embodiment of the present disclosure.

During operation of computer system 600, data-storage management module 630 may generate one or more hints 648 which are associated with commands directed to blocks of data at logical addresses 640 in an address space that is associated with a file system 638. For example, a hint may be generated based on one or more performance characteristics 646 of different types of memory in composite memory device 120 (and, more generally, in a memory system). FIG. 7 presents a block diagram of an address space 700 with blocks of data 710 (which may be in different partitions) for files that are associated with file system 638 (FIG. 6).

Referring back to FIG. 6, a hint may be generated based on one or more characteristics of one or more applications 642 and/or drivers 644. For example, the one or more characteristics may include core services, such as fonts (and, more generally, a data type), that are provided by operating system 626 for an application. In this case, the fonts may be conditionally moved to flash memory from an HDD in composite memory device 120 to improve the performance of the application. More generally, awareness of the different performance characteristics of the different types of memory in hardware and software (such as drivers 644, file system 638 and/or operating system 626) may be used to generate hints 648, and thus to select or modify a characteristic of composite memory device 120 and/or computer system 600.

In some embodiments, a hint is generated based on performance information for different applications (or threads) 636 in activity history 634, which is collected by performance monitor 632. For example, a swap space of computer system 600, files that are accessed within a predetermined time interval by computer system 600 (such as less than 100 ms), and/or information used during a boot cycle of computer system 600 (such as sector 0 on the HDD) may be conditionally moved to the flash memory. Similarly, data that is used infrequently may be conditionally moved to the HDD. In this way, the hint may conditionally move data in composite memory device 120 to obtain improved I/O performance, power consumption, etc., when one or more applications 636 are executed by the one or more processors 610.

Furthermore, a hint may include a conditional suggestion to move or copy a block of data having a logical address to a different type of memory. If the block of data is moved, the logical address in file system 638 may be re-mapped. Alternatively, if the block of data is copied, a pointer in the address space may indicate that the logical address is associated with two or more different types of memory and/or different memory devices.

Furthermore, in some embodiments a hint is used to define an operating mode of composite memory device 120 for multiple subsequent commands. In these embodiments, the hint may be based on one or more global parameters 650, such as power consumption of composite memory device 120 and/or computer system 600, or an environmental condition 652. Thus, the hint may be used to conditionally migrate the data in composite memory device 120 so that power consumption can be reduced. For example, by moving the blocks of data, the HDD and/or the flash memory may be turned off or placed into a low power-consumption state while one or more applications 642, processes and/or threads are executed by computer system 600.

Additionally, in some embodiments hints 648 are generated based on detailed data-disposition information that is provided by composite memory device 120, such as page table 654 or a TLB in the one or more processors 610. However, in other embodiments hints 648 are generated using limited storage information (such as utilization of the types of memory) or without storage information (thus, hints 648 may include suggestions as opposed to specific data-management commands).

Instructions in the various modules in memory 624 may be implemented in: a high-level procedural language, an object-oriented programming language, and/or in an assembly or machine language. Note that the programming language may be compiled or interpreted, e.g., configurable or configured, to be executed by the one or more processors 610.

Although computer system 600 is illustrated as having a number of discrete components, FIG. 6 is intended to be a functional description of the various features that may be present in computer system 600 rather than a structural schematic of the embodiments described herein. In practice, and as recognized by those of ordinary skill in the art, the functions of computer system 600 may be distributed over a large number of servers or computers, with various groups of the servers or computers performing particular subsets of the functions. For example, computer system 600 may include a cloud computing system or a client-server computing system.

Furthermore, in some embodiments system 100 (FIG. 1), system 200 (FIG. 2), computer system 600 and/or address space 700 (FIG. 7) include fewer or additional components. For example, some or all of the functions of memory controller 210 (FIG. 2) may be implemented in processors 110 (FIGS. 1 and 2). (Thus, in some embodiments the memory system may not include a memory controller.) Alternatively or additionally, instead of sharing a common file system in system 100 (FIG. 1), at least some of the different types of memory in composite memory device 120 (FIG. 1) may have separate interface circuits and/or may be managed or accessed separately from each other.

Moreover, two or more components may be combined into a single component and/or a position of one or more components may be changed. Note that in some embodiments the functionality of computer system 600 may be implemented more in hardware and less in software, or less in hardware and more in software, as is known in the art. For example, dedicated control logic may be used to generate the hints in addition to or instead of the one or more processor(s) 110 (FIGS. 1 and 2). Alternatively or additionally, instead of interpreting and conditionally executing hints using control logic 128 (FIGS. 1 and 2), a lower software layer associated with the operating system, the file system and/or the memory system in the host may, at least in part, perform these functions. In some embodiments, some or all of the functionality of computer system 600 is implemented in one or more application-specific integrated circuits (ASICs) and/or one or more digital signal processors (DSPs).

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A composite memory device comprising:
different types of non-volatile memory devices having different performance characteristics;
an interface circuit configured to receive requests, wherein a given request includes a command, a logical address for at least a block of data associated with the command, and a hint associated with the command, wherein the hint is a conditionally executed instruction;
control logic, coupled to the interface circuit and the different types of non-volatile memory, configured to execute the command on the block of data at the logical address in at least one of the different types of non-volatile memory devices, and after completing execution of the command on the block of data, to conditionally execute the hint based on current command traffic through the interface circuit between a host device and the different types of non-volatile memory devices, the hint to specify a future location of the block of data in the different types of non-volatile memory devices, wherein the future location is to cause a data migration among the different types of non-volatile memory devices; and
wherein the control logic is to conditionally execute the hint after the current command traffic is executed.

2. The composite memory device of claim 1, wherein the types of memory devices share a common file system.

3. The composite memory device of claim 1, wherein data partitions in the types of memory devices are arranged in a tiered performance hierarchy.

4. The composite memory device of claim 1, wherein the control logic is further to conditionally execute the hint during execution of the command on the block of data, the conditional execution based on one or more of available memory in the types of non-volatile memory devices, operational states of the types of non-volatile memory devices, target performance characteristics of the composite memory device, or an environmental condition of the composite memory device.

5. The composite memory device of claim 1, wherein after completing executing of the command on the block of data, to conditionally execute the hint based additionally on operational states of the types of non-volatile memory devices.

6. The composite memory device of claim 1, wherein the hint specifies that the block of data is to be written using minimum power consumption.

7. The composite memory device of claim 1, wherein the hint specifies that the command has low priority relative to other commands so that the command is executed when resources are available in the composite memory device.

8. The composite memory device of claim 1, wherein the hint specifies that the block of data is to be purged from a location in one of the types of memory devices.

9. The composite memory device of claim 1, wherein the hint specifies conditions under which the block of data is to be purged from a location in one of the types of memory devices.

10. The composite memory device of claim 1, wherein the hint specifies a data partition in one of the types of memory devices.

11. The composite memory device of claim 1, wherein the different types of non-volatile memory devices include at least one hard disk and flash memory.

12. The composite memory device of claim 1, wherein the request is conveyed to the composite memory device using a standard Serial Advanced Technology Attachment (SATA) command.

13. The composite memory device of claim 1, wherein the request is conveyed to the composite memory device using a non-standard SATA command.

14. The composite memory device of claim 13, wherein the command creates a data partition in at least a portion of one of the types of memory devices.

15. The composite memory device of claim 13, wherein the command instructs the composite memory device to report current data partitions in the types of memory devices.

16. A computer system comprising:
first control logic configured to generate requests, wherein a given request includes a command, a logical address for at least a block of data associated with the command, and a hint associated with the command, wherein the hint is a conditionally executed instruction;
a first interface circuit, coupled to the first control logic, configured to transmit the requests;
a communication link, coupled to the first interface circuit, configured to convey the requests; and
a composite memory device, wherein the composite memory device includes:
different types of non-volatile memory devices having different performance characteristics;
a second interface circuit coupled to the communication link, wherein the second interface circuit is configured to receive the requests; and
second control logic, coupled to the second interface circuit and the different types of non-volatile memory, configured to execute the command on the block of data at the logical address in at least one of the different types of non-volatile memory devices, and after completing execution of the command on the block of data, to conditionally execute the hint based on available memory in the different types of non-volatile memory devices, the hint to specify a future location of the block of data in the different types of memory devices and current command traffic through the second interface circuit between a host device and the different types of non-volatile memory devices, wherein the future location is to cause a data migration among the different types of non-volatile memory devices; and wherein the second control logic is to conditionally execute the hint after the current command traffic is executed.

17. The computer system of claim 16, wherein the hint is generated by one of: the first control logic, a file system in the computer system, and an operating system in the computer system.

18. The computer system of claim 16, wherein the hint is generated based on a power state of the computer system, and the second logic is further to conditionally execute the hint during execution of the of the command on the block of data, the conditional execution based on one or more of operational states of the types of non-volatile memory devices, or a target performance characteristic of the composite memory device.

19. The computer system of claim 16, wherein the hint is generated based on an environmental condition, the environmental condition including a temperature.

20. The computer system of claim 16, wherein the hint is generated based on a desired performance characteristic of an application executed by the computer system.

21. The computer system of claim 16, wherein the hint is generated based on a desired availability of the block of data.

22. The computer system of claim 16, wherein the hint is generated based on a data type of the block of data.

23. The computer system of claim 16, wherein the different types of non-volatile memory devices include at least one hard disk and flash memory.

24. A memory controller comprising:
a first interface circuit configured to receive requests from a second interface circuit of a host device, wherein a given request includes a command, a logical address for at least a block of data associated with the command, and a conditionally executed instruction associated with the command, the conditionally executed instruction to specify internal processing of the associated command by a composite memory device, wherein the request is conveyed to the first interface circuit using a non-standard Serial Advanced Technology Attachment (SATA) command;
control logic coupled to the interface circuit, the control logic configured to execute the command on the block of data at the logical address in at least one of different types of non-volatile memory devices having different performance characteristics in the composite memory device, the control logic further to conditionally execute the conditionally executed instruction based on current command traffic through the first interface circuit between the host device and the different types of non-volatile memory devices; and wherein the control logic is to conditionally execute the conditionally executed instruction after the current command traffic is executed.

25. The memory controller of claim 24, wherein the first interface circuit couples to the composite memory device, the different types of non-volatile memory devices include at least a hard disk drive and flash memory, and the control logic is further to conditionally execute the conditionally executed instruction based on at least one of available memory in the types of non-volatile memory devices, operational states of the types of non-volatile memory devices, or an environmental condition of the composite memory device.

26. A method for executing requests, the method comprising:
receiving the requests in an interface circuit in a composite memory device that includes different types of non-volatile memory devices having different performance characteristics, the types of memory devices including at least one hard disk and flash memory, wherein a given request includes a command, a logical address for at least a block of data associated with the command, and a conditionally executed instruction associated with the command;
for the given request, executing the command on the block of data at the logical address in at least one of the different types of non-volatile memory devices;
for the given request, conditionally executing the instruction, wherein the conditionally executed instruction specifies internal processing of the associated command by the composite memory device based on operational states of the different types of non-volatile memory devices and specifies a future location for the block of data to cause the block of data to be migrated among the different types of non-volatile memory devices;
wherein conditionally executing the instruction is based on current command traffic through the interface circuit between a host and the different types of non-volatile memory devices of the composite memory device; and
wherein control logic is to conditionally execute the instruction after the current command traffic is executed.

* * * * *